(12) United States Patent
Hofbauer

(10) Patent No.: US 7,735,834 B2
(45) Date of Patent: Jun. 15, 2010

(54) TWO-STROKE INTERNAL COMBUSTION ENGINE WITH OIL RING

(75) Inventor: Peter Hofbauer, West Bloomfield, MI (US)

(73) Assignee: FEV Engine Technology, Inc., Auburn Hills, MI (US)

( * ) Notice: Subject to any disclaimer, the term of this patent is extended or adjusted under 35 U.S.C. 154(b) by 0 days.

(21) Appl. No.: 11/296,091

(22) Filed: Dec. 7, 2005

(65) Prior Publication Data

US 2007/0125323 A1 Jun. 7, 2007

(51) Int. Cl.
*F16J 9/20* (2006.01)
*F01D 11/02* (2006.01)
*B60T 11/236* (2006.01)
*F02B 25/00* (2006.01)

(52) U.S. Cl. .................. 277/438; 277/422; 277/489; 123/65 R

(58) Field of Classification Search ............... 123/73 R, 123/193.2, 193.4, 74 R, 65 R; 277/434, 438, 277/467, 472, 473, 489
See application file for complete search history.

(56) References Cited

U.S. PATENT DOCUMENTS

| | | | | |
|---|---|---|---|---|
| 1,796,603 A * | 3/1931 | Junkers | .................. | 123/196 R |
| 1,871,820 A * | 8/1932 | Morton | ........................ | 277/500 |
| 1,959,769 A * | 5/1934 | Simmen | ........................ | 92/5 R |
| 2,182,851 A * | 12/1939 | Muchnic | ..................... | 277/489 |
| 2,968,501 A * | 1/1961 | Tisch | ......................... | 277/448 |
| 3,095,204 A * | 6/1963 | Neely | ........................ | 277/442 |
| 3,418,001 A * | 12/1968 | Rentschler et al. | .......... | 277/589 |
| 3,456,952 A * | 7/1969 | Mayhew et al. | ............. | 277/466 |
| 3,604,716 A * | 9/1971 | Webert | ........................ | 277/345 |
| 3,645,542 A * | 2/1972 | Adams | ........................ | 277/311 |
| 3,723,200 A * | 3/1973 | Castrucci et al. | ............ | 438/358 |
| 3,848,880 A * | 11/1974 | Tanner | ........................ | 277/584 |
| 4,121,838 A * | 10/1978 | Sakamaki | ..................... | 277/586 |
| 4,681,817 A * | 7/1987 | Shinada | ...................... | 277/442 |
| 4,848,212 A * | 7/1989 | Kawano et al. | ............. | 277/434 |
| 4,969,425 A * | 11/1990 | Slee | ........................ | 123/73 AA |
| 5,133,563 A * | 7/1992 | Casellato | .................... | 277/452 |
| 5,675,076 A * | 10/1997 | Esch et al. | ..................... | 73/116 |
| 5,881,687 A * | 3/1999 | Sakaguchi et al. | ........ | 123/65 R |
| 5,893,318 A * | 4/1999 | Cheng et al. | ............... | 92/169.1 |
| 6,485,027 B1 * | 11/2002 | Carrie et al. | ................. | 277/440 |
| 6,536,385 B1 * | 3/2003 | Takashima | ................ | 123/73 C |
| 6,713,535 B2 * | 3/2004 | Orkin et al. | .................. | 523/428 |
| 2005/0186424 A1 * | 8/2005 | Murakami et al. | .......... | 428/408 |

OTHER PUBLICATIONS

Viton® Brochure. Oct. 2005. <http://www.dupontelastomers.com/products/viton/viton.asp>.*

* cited by examiner

*Primary Examiner*—Michael Cuff
*Assistant Examiner*—Ka Chun Leung
(74) *Attorney, Agent, or Firm*—Gifford, Krass, Sprinkle, Anderson & Citkowski, P.C.

(57) ABSTRACT

A two-stroke internal combustion engine having a seal assembly disposed between a piston and a running surface. The seal both lubricates and prevents exhaust of combustion gases. A first element, which ensures gas tightness, is received in a countersunk portion of the running surface. A second element, which ensures oil tightness, is partially embedded into the first element. A biasing element presses the second element against the first element so that the second and third elements are at least partially held within the first element.

18 Claims, 4 Drawing Sheets

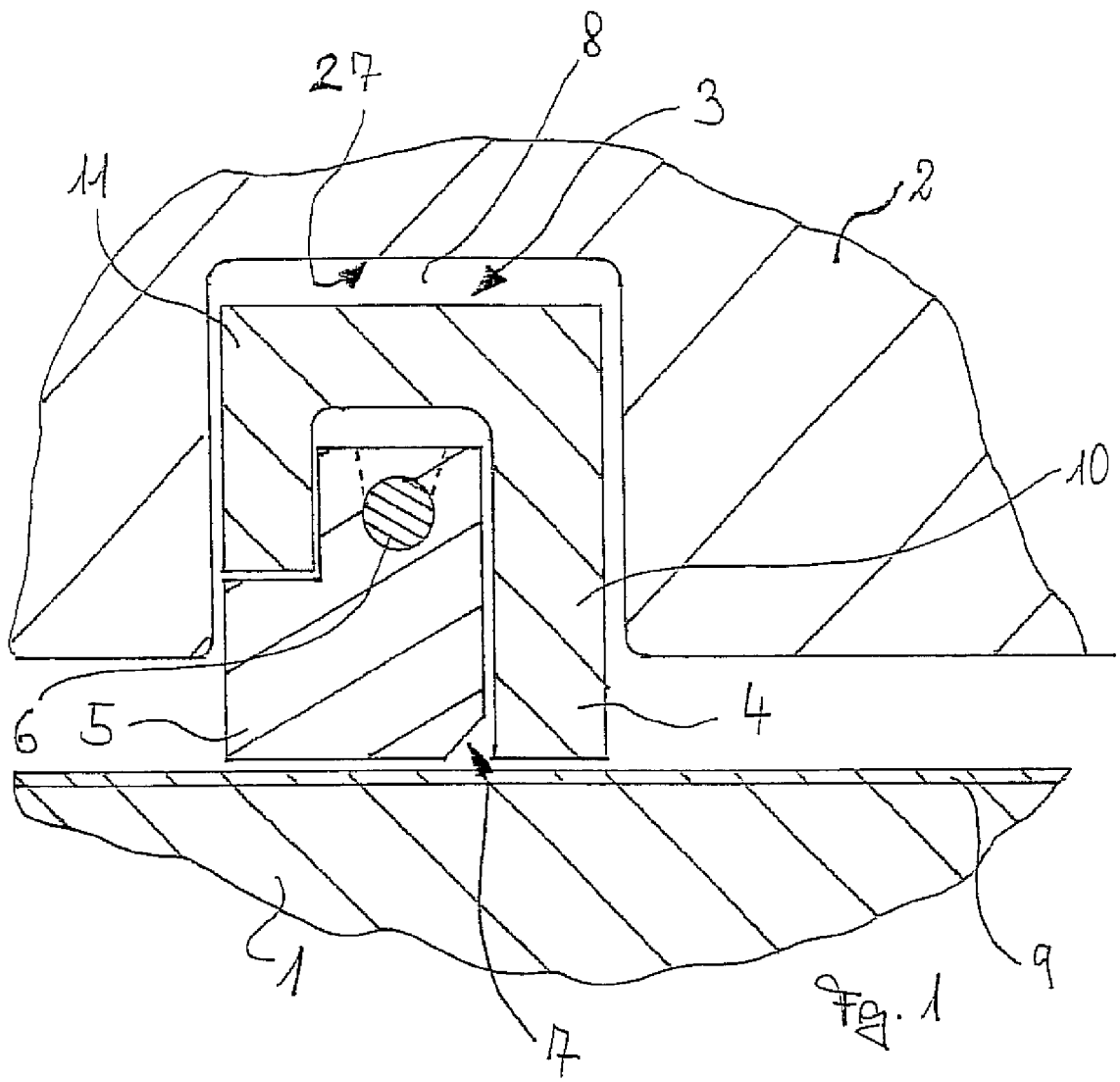
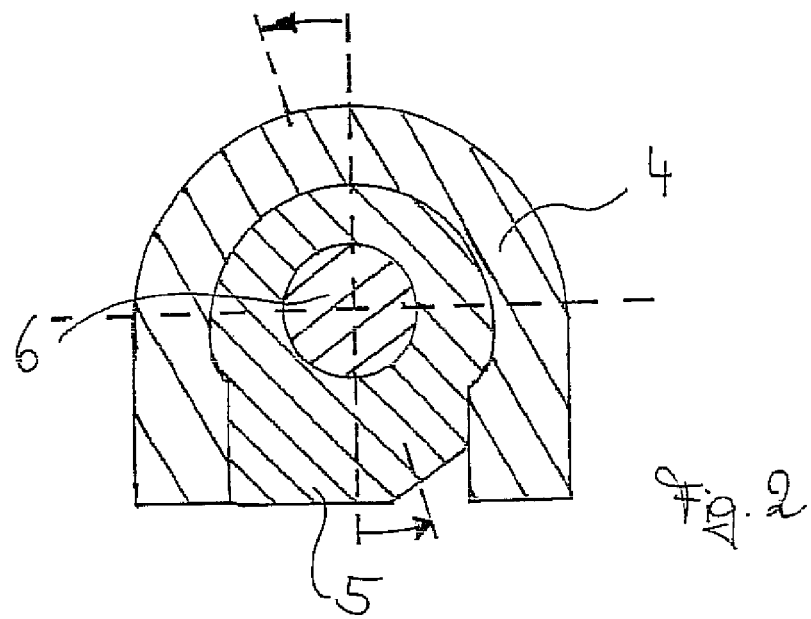

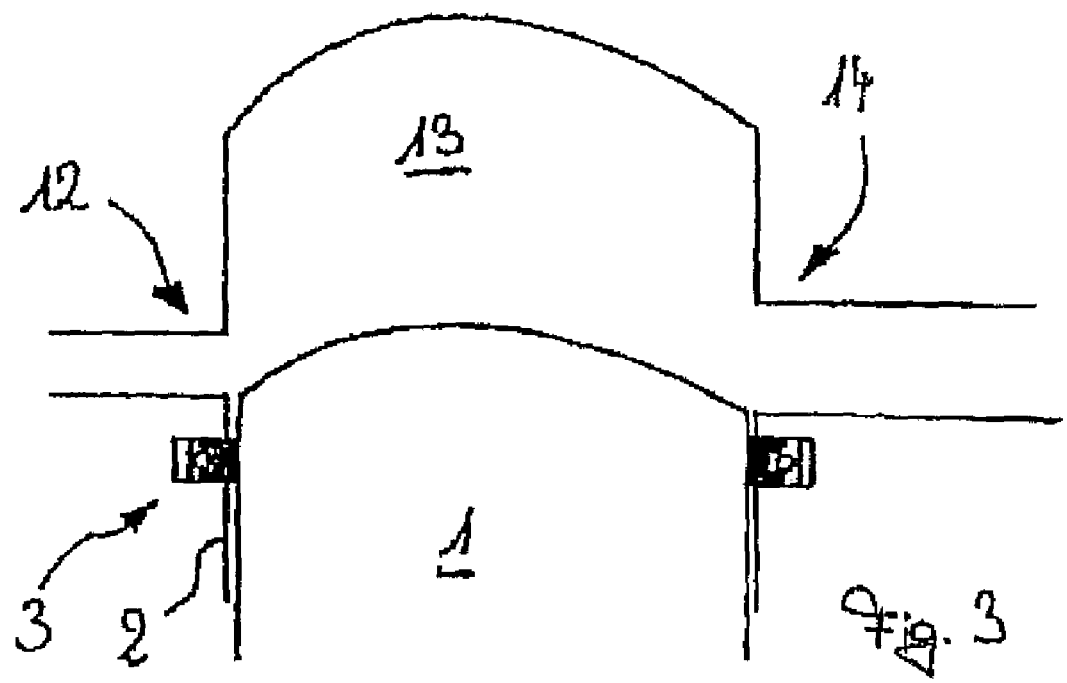
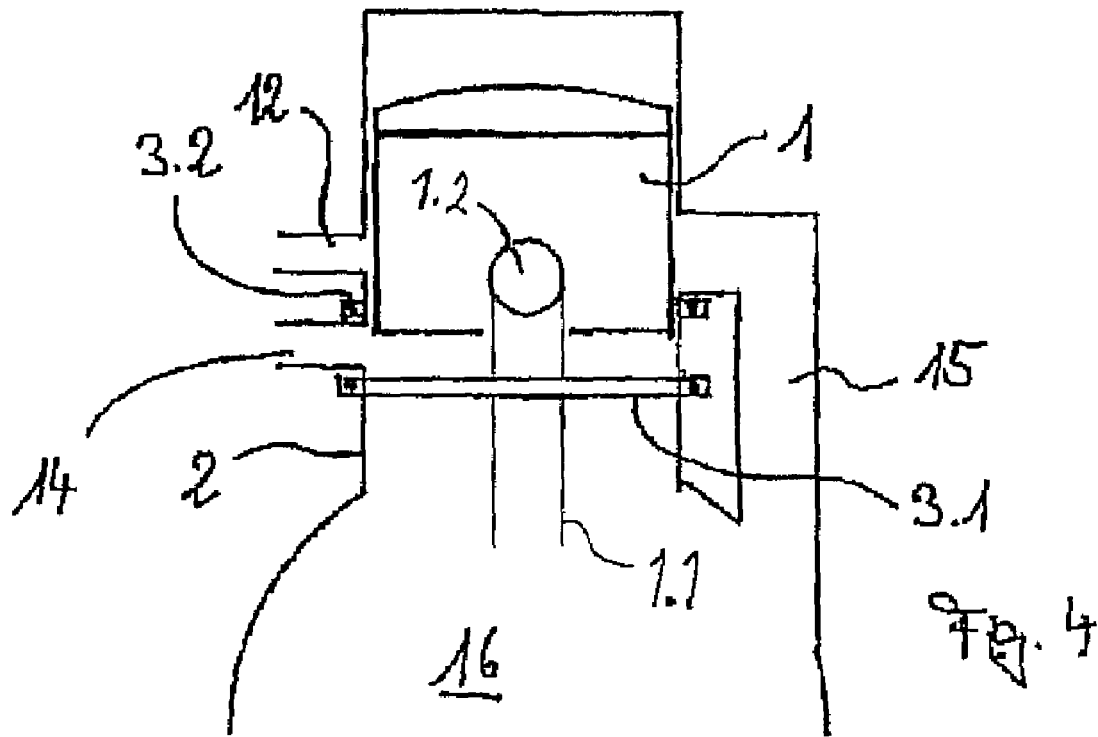

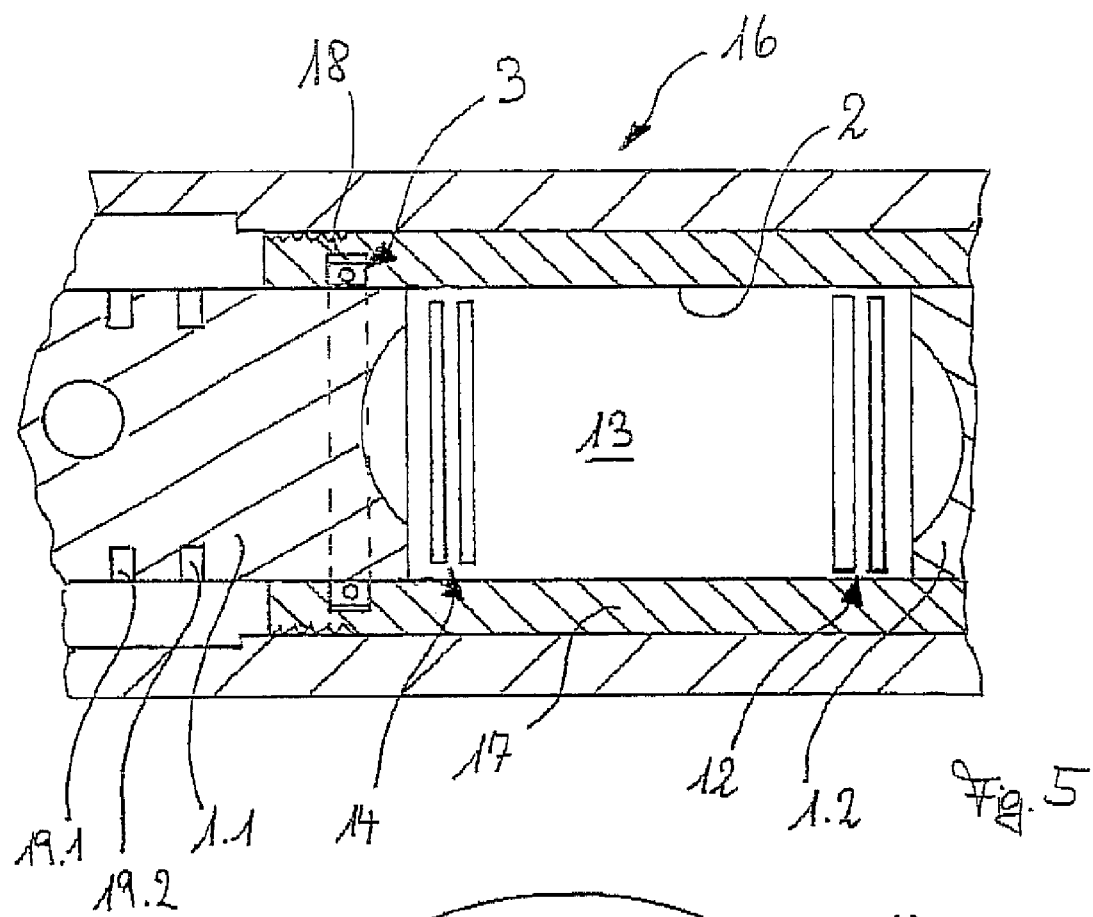
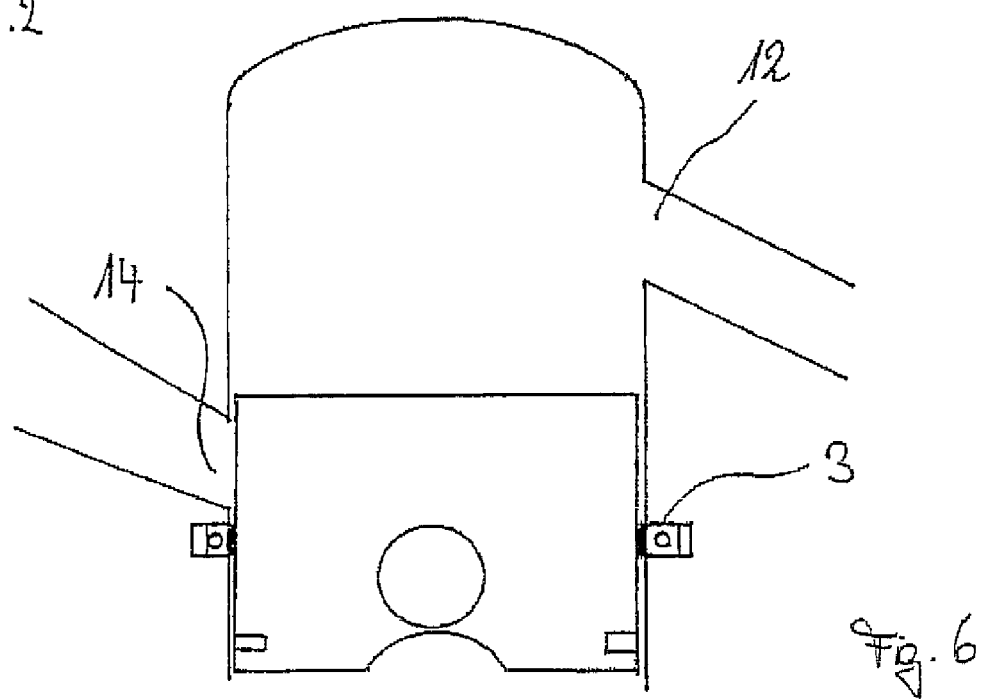

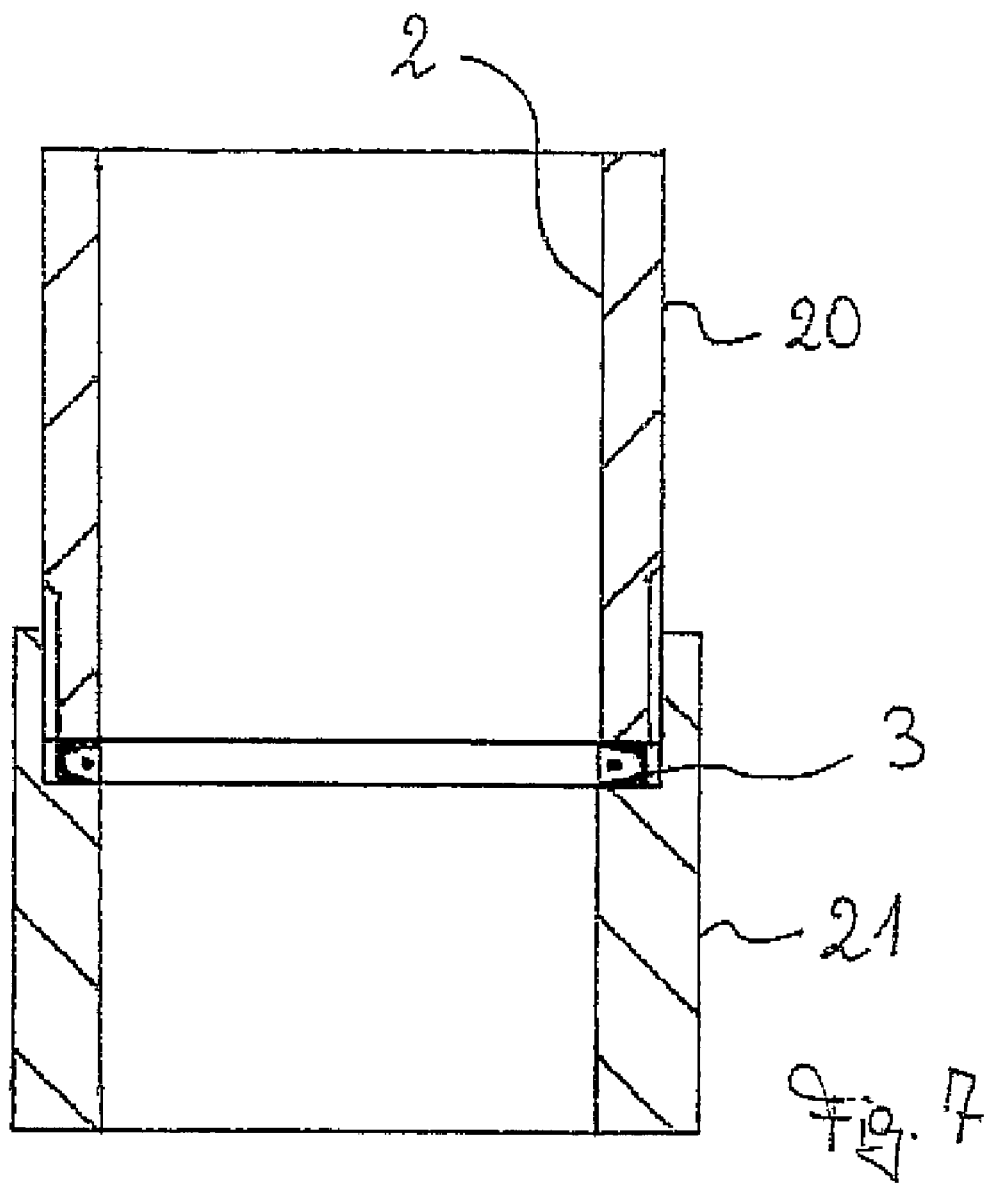

TWO-STROKE INTERNAL COMBUSTION ENGINE WITH OIL RING

FIELD OF THE INVENTION

The present invention relates to a two-stroke internal combustion engine having at least one port of a gas control system for an inlet and/or an outlet, with a gap between a reciprocating piston and a running surface surrounding the piston being sealed.

BACKGROUND OF THE INVENTION

As is known in two-stroke internal combustion engines only two strokes are required for a work cycle and thus only a single crankshaft rotation is required. Such two-stroke methods are used, for example, in fast-running small gasoline engines, especially model engines, as well as for large engines, for example, in shipbuilding. Often the engine is fed a fuel-oil mixture, with the oil portion being used for lubrication. However, there are also two-stroke internal combustion engines, which are operated without a fuel-oil mixture.

SUMMARY OF THE INVENTION

The present invention provides a two-stroke internal combustion engine with the advantage of providing a simple engine construction and simultaneously avoiding complicated lubrication and high oil consumption.

The invention proposes a two-stroke internal combustion engine with at least one port of a gas control system for an inlet and/or an outlet; wherein a gap is formed between a reciprocating piston and a running surface surrounding the piston being sealed; wherein a seal assembly is arranged in the running surface for sealing the gap. The piston slides along this combination seal. Preferably, the seal assembly is arranged, such that the piston contacts the seal assembly at all operating points. For example, for this purpose the piston can feature an extended piston skirt. The seal assembly can also contact the piston only partially in a region around bottom dead center [BDC] or top dead center [TDC], for example, in recesses for the piston pin or the like.

Preferably, the seal assembly exhibits, on the one hand, at least a gas sealing function and, on the other hand, an oil controlling function. The oil controlling function can also be expanded, in particular, such that oiltightness is also provided by the combination seal. In particular, the seal assembly is arranged in the running surface, such that it creates a separation between an oil chamber and one or more ports of the gas control system. In particular, the ports can also be replaced or also expanded by one or more inlet and/or outlet valves. There is the ability to also provide the two-stroke internal combustion engine on the inlet side with a rotary valve control system or a diaphragm control system. On the outlet side, a rotary slide valve control system and also a combination of a valve and port control system can be provided. Gas exchange through charging, resonance systems, or the like can also be supported.

According to one embodiment, the seal assembly has at least one first element, which guarantees gastightness and which is countersunk into the running surface, and one second element, which guarantees oiltightness, with the second element being embedded at least partially in the first element. For example, the first element has a U-shaped section, in which the second element is held with the aid of a compressive force element. Preferably, the compressive force element is a spring ring, which presses the second element against the first element. However, the spring ring can also press the second element in the direction of the piston, with an intermediate space being generated, in particular, between the first element and the second element. Thus, a tensile force element can also be used.

In order to minimize wear of the combination seal, the piston is coated in a friction and wear reducing way at least over one region of its periphery that comes into contact with the combination seal. A coating can be, for example, a lead/tin coating, a graphite coating, a phosphate coating, a nickel coating, a plastic layer, an iron coating, and/or a ceramic coating. Preferably, differently shaped coatings can also be provided along the piston skirt.

In addition, piston cooling can be realized by means of spray cooling, in which the oil is sprayed below the piston head. In an alternative embodiment, injection cooling can be realized. Here, oil is injected by means of a cooling channel in the piston and heat is discharged. In a different embodiment, in turn, compression cooling is provided by means of cooling channels in the piston, whereby the piston is a component of the lubricating system. In order to minimize the heat load on the piston, the seal assembly has the ability, for example, to dissipate heat. This can be realized, for example, by means of a fourth element. However, it is possible that such a function is taken over by one of the already existing elements of the combination seal, especially by means of the first element. In this way, it is possible to minimize the number of piston rings for the piston itself. According to a preferred embodiment, the piston has at most two piston rings. The piston ring gaps of the two piston rings are offset by 180° in one region relative to each other on the outer periphery of the piston. In this way, the combustion gases are prevented from blowing by directly from the combustion chamber into the oil chamber. According to an alternative embodiment, the piston ring gaps are offset relative to each other by a region of approximately 120°, with a possible gap of the seal assembly preferably also being offset by 120° relative to the piston ring gaps in the region. Preferably, the seal assembly has a gap, which extends in the shape, for example, of a labyrinth seal. For this purpose, for example, the first element can have a tab on a gap surface. This tab engages in a recess of an opposing gap surface of the first element. Preferably, the seal assembly is closed over its periphery. Here, preferably at least one of the elements of the seal assembly is closed. This can be realized, for example, by means of galvanization, adhesion, non-positive joining, welding, soldering, or also positive-fit closing.

In particular, the seal assembly is gastight such that blow-by of combustion gases can be minimized as much as possible and such that the otherwise generated pollutant components, especially soot components, can be further minimized. This minimization is reinforced in that the piston itself has at least one compression ring which is arranged outwards towards the combustion chamber. The compression ring has, for example, a crowned contour. However, it can also be configured as a wedge ring or an L-ing.

According to a preferred embodiment, the seal assembly and at least one piston ring arranged on the piston are arranged between an oil chamber, especially a crankcase, and the one or more ports of the gas control system, without the piston ring being movable past the combination seal. In this way, it is guaranteed that the seals or rings for forming a seal do not mutually cancel out their function. In addition, in this way it can be guaranteed that the seal assembly is arranged in a region, which preferably seals the inlet and the outlet from the oil chamber, while the piston ring has the task of being able to provide a seal between the inlet and the outlet.

Preferably, the two-stroke internal combustion engine has a wall of a piston pin bushing as the running surface. The piston pin bushing can be configured as a so-called wet bushing or also as a dry bushing. A wet bushing is inserted, for example, loosely and sealed, for example, with O-rings. However, it can also be shrink-fitted. As a dry bushing, the piston pin bushing is preferably pressed in.

In addition, there is the possibility that the running surface configuration is formed in a composite casting. Here, bushings made from gray cast iron are laid into the casting mold and encased by cylindrical liquid cast iron. In addition, there is the possibility that the running surface is a component of the engine block. Preferably, the running surface is also coated. For example, the running surface is hard chrome-plated. In addition, there is the possibility to produce the running surface from an aluminum-silicon alloy, which, for example, is etched in a post-processing step in order to achieve a wear-resistant surface.

In another preferred embodiment, the piston pin bushing or the part of the engine block, which forms the running surface, is divided into at least two parts. For example, the piston pin bushing is assembled from at least one first and one second part, with the seal assembly being inserted between the first and the second parts. Here, preferably any region of the running surface that comes into contact with a piston ring of the piston is continuous. Preferably, the two parts can be screwed together, with, for example, the first and the second parts each having an internal or external threading. However, there is also the possibility that the two parts can be held together in their position by means of a piston ring pressure applied by a screw. The piston pin bushing preferably has a threaded attachment. In this way, it can also be guaranteed that the seal assembly can be placed with extreme precision. Preferably, the seal assembly can be linked with adjustability in terms of its positioning. For example, this can be realized by means of the screw. In particular, in this way, precise positioning of the seal assembly in the running surface is enabled. The piston pin bushing, especially a running bushing, is preferably divided in order to enable the use of continuous combination seals. In particular, a spring can be divided while the embedded section for the spring is continuous.

In another preferred embodiment of the two-stroke internal combustion engine, this has several ports on the inlet side and outlet side for gas exchange, with a spacing between a piston ring of the piston in the bottom dead center position and the seal assembly in the running surface equaling less than five millimeters. In this way, on the one hand, a pumping volume is established between the piston ring and the piston seal. On the other hand, this permits an especially space-saving configuration of the two-stroke internal combustion engine. Preferably, such a configuration is also used in a double-piston internal combustion engine. One example of a double-piston internal combustion engine appears, for example, in EP 156 172 A2, in which an opposed piston system is also integrated at the same time. The disclosure in this document in terms of the two-stroke internal combustion engine, its use, and configuration are referenced in the scope of the present invention.

In another embodiment, the two-stroke internal combustion engine is built such that a cylindrical outer periphery of the piston on which the seal assembly slides, is spaced at less than ten millimeters from a bore hole, by which means the piston can be sealed by a piston pin on a lifting device. Such a configuration permits especially space-saving pistons, which can be inserted with a seal assembly as described. In particular, the piston skirt can be of different lengths. Different materials can also be used in the piston. For example, as materials for the piston, aluminum-copper alloys, aluminum-silicon alloys, or the like can be used. The piston can be shaped as a ring-bearing piston, which preferably has a reinforced groove for the topmost piston ring and also preferably a protective border for a compression chamber. In another configuration, the piston is built as an autothermic piston with encased autothermic segments. These have a bimetal effect, whereby a transverse port for separating the piston shaft and the ring parts can be created.

According to another embodiment, the seal assembly receives its gastightness at least partially in that a seal is formed by pressing the seal assembly onto the piston through the effective gas pressure. For this purpose, for example, the combination seal, which is arranged in the running surface, is at least partially at a distance from an outer surface of a groove in a running surface in which the seal assembly is arranged. Therefore, the effective gas pressure between this outer surface of the groove and the seal assembly can be made active and exerted on the combination seal. Therefore, the seal assembly is pressed against the piston skirt.

According to another concept of the invention, it is proposed to arrange the seal assembly between a reciprocating piston and a running surface opposite the piston, especially a cylinder wall of an internal combustion engine; wherein the seal assembly has multiple parts and provides on its inner side a gas and oil seal; wherein a first element of the seal assembly essentially guarantees the gas seal and a second element essentially guarantees the oil seal, and by means of a third element a force can be exerted at least on the second element in order to generate movement of the second element in the direction of an interior of the combination seal; wherein the first element forms an outer side of the combination seal, and the third element is embedded in the first element. In another configuration of the third element, the force that is exerted generates movement of the second element in the direction of the exterior of the combination seal. Preferably, the third element is a spring ring. In another configuration, the second element consists of Viton. In a refinement, the second element has on its inner side, which is directed towards the piston, a floating region. The floating region is preferably ramp-like and enables contact of the second element on the piston based on a rocking motion, for example. In this way, especially tight oil control is realized on the piston itself. Here, the floating region is directed towards the combustion chamber. Preferably, another region of the second element, which contacts the piston, has a pointed shape. This permits wiping of oil deposited on the piston surface. The wiped oil preferably remains in the oil region and thus can be fed back, in particular, into a crankcase. This configuration prevents an oil blanket from being formed on the piston due, on the one hand, to the longitudinal movement of the piston rings and, on the other hand, to contact of the piston on the combination seal.

Preferably, the seal assembly is used with a running surface and/or a reciprocating piston, which have micro-oil pockets preferably generated through laser processing in their surfaces. The effect of the seal assembly is such that these micro-oil pockets are filled by the distribution of wiped oil.

BRIEF DESCRIPTION OF THE DRAWINGS

Additional advantageous configurations and refinements are explained in more detail with reference to the following drawing. However, the features described there are not limited to the corresponding configurations. Instead, these features can be linked with other features from other configurations to form improvements. There is also the possibility of linking these features with the features described above into improvements. In particular, the configurations shown in the drawing are not to be interpreted as restrictive. Shown are:

FIG. 1, a cutout from a two-stroke internal combustion engine not shown in more detail, with a first configuration of a combination seal, which is arranged in a running surface, FIG. 2, a second configuration of a combination seal, FIG. 3, a schematic representation of a first two-stroke internal combustion engine and an arrangement of a combination seal, FIG. 4, a second two-stroke internal combustion engine in schematic view with an example arrangement of a first and a second combination seal, FIG. 5, a schematic view of a double-piston internal combustion engine, which is operated as a two-stroke internal combustion engine, in which the seal assembly is arranged in the running surface, FIG. 6, a third two-stroke internal combustion engine with one possible arrangement of a combination seal, and FIG. 7, an example configuration of a position of a seal assembly with a first part and a second part of a running surface, which are preferably screwed together.

DETAILED DESCRIPTION OF THE INVENTION

FIG. 1 shows a cutout from a two-stroke internal combustion engine with a cutout of a piston 1 and an opposite running surface 2. A seal assembly 3 is arranged in the running surface 2. The seal assembly 3 has a first element 4, a second element 5, and a third element 6. The first element 4 is preferably used as a gas seal. The second element 5 is preferably used for achieving oiltightness, with the second element preferably having a floating region 7. The third element 6 is preferably embedded in the second element 5, especially connected to each other. The second element 5 can thus be shown as completely surrounding the third element 6. However, the second element 5, as indicated by the dashed lines, can be at least partially, but especially completely, open, so that the third element 6 can be inserted into the second element 5 preferably with a positive and/or non-positive fit. For example, the third element 6 can act as a spring element. According to one configuration, it is pressed into and held in a cutout in the third element 6. The cutout is shaped so that it prevents falling out by means of a locking effect. In turn, the second element 5 is embedded in the first element 4. Preferably, the first element 4 has a receptacle whose shape matches that of the second element 5. For example, the first element can be U- or L-shaped. The third element 6 is used preferably for generating a force. The force can be exerted on the second element 5 and, on the one hand, leads to the result that the second element remains in the first element 4. On the other hand, the third element 6 can also exert a force through which the second element 5 is pressed against the piston 1. For example, the second element 5 can be arranged so that it performs a relative movement in the first element 4. In addition, preferably the first element 4 is arranged in a groove 27 so that it can also perform a relative movement in the running surface 2. Through the space 8 formed between the first element 4 and an outer surface of the groove 27, the gas forces, especially those from the combustion chamber, can act on the first element 4. In this way, a compression force can be exerted on the first element. The second element 5 preferably has a pressure that is smaller than that of the combustion chamber not shown in more detail. Through a connection to the not-shown oil chamber, especially the not-shown crankcase, a smaller pressure is exerted. The resultant from the effective gas pressures enables contact of the first element 4 and also through a corresponding positive and/or non-positive fit between the first element 4 and the second element 5 also the contact of the second element 5 on the piston 1. In turn, the piston 1 preferably has a coating 9. This reduces wear and enables long-term resistance for the seal assembly 3.

In particular, there is the possibility that the seal assembly 3 has one or more surface shapes which change in contact with the coating 9 in the course of the use of the seal assembly 3. Thus, the surface shape can provide a region which is worn through friction during run-in, that is, during the first startup of the two-stroke internal combustion engine, and which is preferably divided along the running surface 2 or along the outer surface of the piston 1. This coating can be used to prevent damage to the running surfaces. In addition, such a run-in also enables exact adaptation to the appropriate tolerances of each individual internal combustion engine.

As shown in FIG. 1, the first element 4 has preferably two unequal legs. The longer leg 10 is arranged in the direction of the combustion chamber not shown in more detail, while the shorter leg 11 lies in the direction of the oil chamber not shown in more detail. In this way, the longer leg 10 permits the application of gastightness relative to the second element 5. The floating region 7, in turn, is likewise arranged in the direction of the combustion chamber. In this way, on the one hand, oil passing between the longer leg 10 and the coating 9 can be collected. On the other hand, the floating regions leads to the fact that the second element 5 is rotated, for example, about the third element 6 and therefore is pressed more strongly against the coating 9. This configuration increases the gastightness.

In the following, identical or similar features are provided with identical reference symbols, however, without this to be interpreted as restrictive.

FIG. 2 shows another configuration of a seal assembly 3. Here, the second element 5 is completely embedded in the first element 4, with the first element 4 preferably having two equally long legs. The corresponding shape of the first and the second elements 4, 5 is adjusted to each other, so that both can be clipped together. The first element 4, like the second element 5, can be deformed at least partially plastically, especially elastically. In particular, at least one of the two elements 4, 5 can be not only flexible, but instead especially completely elastic in at least one partial region. This can be guaranteed through suitable material selection. In addition, the first element 4 can also be used for heat transfer from the piston to the cylinder material. For example, for this purpose the first material 4 can have a heat-conductive material. This heat-conductive material can be embedded, for example. This material can be metal wires or the like. Through positive-fit connection of the first and the second element 4, 5, for example for a rotary movement about the third element 6, a similar rotational movement is impressed on all of the elements. For this purpose, it can be advantageous that an outer surface of the first element 4 is at least partially rounded.

FIG. 3 shows a first two-stroke internal combustion engine in schematic view. Air is fed into a combustion chamber 13 by means of an intake port 12. The combusted exhaust gas is discharged out of the combustion chamber 13 by means of an exhaust port 14. The seal assembly 3 is arranged in this configuration underneath the intake port 12 or the exhaust port 14. Not shown is that the piston 1 can have one or more piston rings, which are preferably arranged such that at BDC these come to contact the running surface 2 above the combination seal. According to the shown configuration, it is possible to provide a two-stroke combustion engine with a transverse scavenging system, which has the crankcase not shown in more detail sealed by the seal assembly 3 arranged in the running surface 2.

FIG. 4 shows a second configuration of a two-stroke internal combustion engine. Here, an overflow channel 15 is provided, from which exhaust gas can flow into the oil chamber shown as a cutout or into the crankcase 16. For example, the piston 1 can have a piston ring, while the running surface 2 has two combination seals 3. While the first seal assembly 3.1 is arranged underneath both ports, the second seal assembly 3.2 is arranged between the intake port 12 and the exhaust port 14. In this way, it can be guaranteed that an additional seal is provided, which prevents blow-by from the intake port into the exhaust port of the two-stroke internal combustion engine. Alternatively, only one of the two combination seals 3.1, 3.2 can also be provided. Here, however, then there is at least one, preferably two piston rings on the piston 1. In addition, the piston 1 is sealed by a piston pin 1.2 on a lifting device 1.1.

In an example configuration as a cut-out, FIG. 5 shows a two-stroke internal combustion engine in the form of a double-piston engine 16. The combustion chamber 13 is defined by means of a first piston 1.1 and a second piston 1.2. Thus, as shown, the combustion chamber is scavenged since the inlet ports and the outlet ports 12, 14 are opened. The running surface 2 is provided by means of a piston pin bushing 17, which has the seal assembly 3 in a corresponding recess 18. The piston pin bushing is preferably screwed to the cylinder and therefore can be adjusted in its position. For example, the position of the seal assembly 3 can also be changed in terms of the position relative to TDC or BDC. As an example, the first piston 1.1 has, as shown, two piston rings 19.1, 19.2. By means of these rings, another seal relative to the running surface 2 can be formed.

FIG. 6 shows another configuration of a two-stroke internal combustion engine with transverse scavenging. Here, in turn, the seal assembly 3 is arranged underneath the exhaust port 14 and the intake port 12. A piston ring is arranged underneath the seal assembly 3, with this being arranged in the piston skirt far enough down that it does not come into contact with the seal assembly 3.

In an example configuration, FIG. 7 shows the assembly of the running surface 2 by means of a first part 20 and a second part 21. The first and the second parts 20, 21 are arranged so that they can move relative to each other. The seal assembly 3 can be arranged between these parts. By means of this separation of the running surface into a first and a second region, the seal assembly 3 can have a completely closed extent. In particular, there is the possibility of being able to eliminate a continuous gap in a combination seal. Preferably, the first and the second parts 20, 21 are screwed together. This enables, on the one hand, the application of a sufficient fixing force between the two parts 20, 21. On the other hand, this screw connection simultaneously permits the formation of the required gastightness.

I claim:

1. A two-stroke internal combustion engine with at least one port of a gas control system for an intake and/or exhaust, comprising:
    a combination seal comprising at least a first element having a U-shaped section with a first leg and a second leg, said second leg extending to a piston and providing a gas seal and counter sunk into a running surface, and a second element having a recess adjacent said piston, providing an oil seal and embedded at least partially into said first element;
    said combination seal located at least partially in a gap between said reciprocating piston and said running surface surrounding said piston.

2. The two-stroke internal combustion engine of claim 1, characterized in that said first element has a U-shaped section, in which said second element is held with the aid of a compressive force element.

3. The two-stroke internal combustion engine of claim 2, characterized in that said compressive force element is a spring ring, which presses said second element against said first element.

4. The two-stroke internal combustion engine of claim 1, characterized in that said second leg is longer than said first leg and provides said gas seal.

5. The two-stroke internal combustion engine of claim 4, characterized in that said second element extends beyond said second leg to said piston and provides said oil seal.

6. The two-stroke internal combustion engine of claim 1, characterized in that said combination seal is arranged as a separation of an oil chamber from said at least one port of said gas control system.

7. The two-stroke internal combustion engine of claim 1, characterized in that said piston is coated in a friction- and wear-reducing way at least over a region of its periphery, which comes into contact with said combination seal.

8. The two-stroke internal combustion engine of claim 1, characterized in that said piston has a maximum of two piston rings.

9. The two-stroke internal combustion engine of claim 1, characterized in that said combination seal and at least one piston ring arranged on said piston are arranged between an oil chamber and said at least one port of said gas control system, without said at least one piston ring being movable past said combination seal.

10. The two-stroke internal combustion engine of claim 1, characterized in that said engine has several ports on said intake and exhaust sides for gas exchange, wherein a spacing between a piston ring of said piston in a bottom dead center position and said combination seal in said running surface equals less than five millimeters.

11. The two-stroke internal combustion engine of claim 1, characterized in that a cylindrical outer extent of said piston, on which said combination seal slides, is spaced up to less than 10 millimeters to a bore hole, by means of which the piston can be connected via a piston pin to a lifter.

12. A combination seal for arrangement between a piston and a cylinder wall of an internal combustion engine opposite said piston, said combination seal comprising:
    an inner side providing a gas seal and an oil seal;
    said combination seal further comprising:
        a first element, a second element and a third element;
        said first element forming an outer side, having a U-shaped section with a first leg and a second leg, said second leg being longer than said first leg and guaranteeing said gas seal on said inner side;
        said second element embedded within said first element, having a recess adjacent said inner side and guaranteeing said oil seal on said inner side; and
        said third element embedded within said first element and exerting a force on at least said second element, said force providing movement of said second element in a directions generally towards said inner side.

13. The combination seal of claim 12 characterized in that said third element is a spring ring.

14. The combination seal of claim 12, characterized in that said second element has a floating region on said inner side.

15. The combination seal according of claim 12, characterized in that said combination seal is a closed circle.

16. The combination seal of claim 12 characterized in that said second element extends beyond said second leg and guarantees said oil seal on said inner side.

17. A two-stroke internal combustion engine with at least one port of a gas control system for an intake and/or exhaust, comprising:

a combination seal counter sunk into a running surface having at least a first element having a U-shaped section with a first leg and a second leg, said first leg and said second leg being of unequal length and said second leg extending to a piston and providing a gas seal, and a second element embedded at least partially into said first element;

said combination seal located at least partially in a gap between said reciprocating piston and said running surface surrounding said piston.

18. The combination seal of claim 17 characterized in that said second element embedded at least partially into said first element provides an oil seal.

\* \* \* \* \*